US006396487B1

United States Patent
Jameson

(10) Patent No.: US 6,396,487 B1
(45) Date of Patent: *May 28, 2002

(54) USER INTERFACE ENHANCEMENT FOR WINDOWS-BASED OPERATING SYSTEMS

(75) Inventor: David Henry Jameson, Chappaqua, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/046,222

(22) Filed: Mar. 23, 1998

(51) Int. Cl.[7] .............................................. G06F 13/00
(52) U.S. Cl. ...................................... 345/342; 345/349
(58) Field of Search ................................ 345/339, 340, 345/348, 342, 349, 354

(56) References Cited

U.S. PATENT DOCUMENTS

| | | | | |
|---|---|---|---|---|
| 4,831,556 A | * | 5/1989 | Oono ........................... 345/340 |
| 5,113,517 A | * | 5/1992 | Bear et al. ..................... 703/23 |
| 5,485,175 A | * | 1/1996 | Suzuki ........................ 345/352 |
| 5,500,936 A | * | 3/1996 | Allen et al. .................. 345/352 |
| 5,621,430 A | * | 4/1997 | Bricklin ...................... 345/119 |
| 5,644,737 A | * | 7/1997 | Tuniman et al. ............. 345/352 |
| 5,646,647 A | * | 7/1997 | Chow .......................... 345/145 |
| 5,757,371 A | * | 5/1998 | Oran et al. ................... 345/348 |
| 5,864,330 A | * | 1/1999 | Haynes ........................ 345/856 |
| 5,880,733 A | * | 3/1999 | Horvitz et al. .............. 345/355 |
| 5,905,492 A | * | 5/1999 | Straub et al. ................ 345/333 |
| 6,204,845 B1 | * | 3/2001 | Bates et al. ................. 345/788 |
| 6,219,052 B1 | * | 4/2001 | Gould ......................... 345/341 |

* cited by examiner

*Primary Examiner*—Ba Huynh
(74) *Attorney, Agent, or Firm*—Whitham, Curtis & Christofferson, P.C.; Stephen C. Kaufman

(57) ABSTRACT

A more convenient way to resize an application window on a computer display screen which also facilitates movement of the window are provided new icons, called a "corner" icon and a "scroll" icon, in the title bar of the window. Instead of moving the cursor to an edge or corner of the window to resize the window, the user simply clicks on the new "corner" icon and drags the icon to resize the window. This mechanism allows other enhancements. For example, an optional magnification factor allows the window to be resized in an amount proportional to a multiple factor of the actual cursor movement. Thus, small changes in cursor movement result in large changes in the window size. The reverse is also useful to allow very precise window positioning. Similarly, the user simply clicks on the new "scroll" icon and drags the icon to scroll and pan the displayed content of the window. As with the resizing operation, an optional magnification can be applied to the scrolling operation.

12 Claims, 3 Drawing Sheets

USER INTERFACE ENHANCEMENT FOR WINDOWS-BASED OPERATING SYSTEMS

BACKGROUND OF THE INVENTION

1. Field of the Invention

The present invention generally relates to windows-based operating systems for computers and, more particularly, to a user interface enhancement which allows the user to conveniently perform operations on a displayed window by means of icons displayed in the window's title bar using a drag and drop operation of the mouse controlled cursor.

2. Background Description

Graphic user interfaces (GUIs) are now standard in most operating systems. Such operating systems are also now multitasking, allowing multiple applications to be running at time. A windowing display is used in which each application runs in its own window, and these windows may be tiled, cascaded or otherwise arranged on the computer display screen so that multiple windows are visible at a time. Only one of the applications operates in the foreground at a time, and this is typically determined by a click of the left mouse button (or the only mouse button in the case of a one button mouse) while the pointing cursor is within the window. Examples of such windowing operating systems are International Business Machines (IBM) Corporation's OS/2 operating system, Microsoft's Windows 95 operating system, Apple Macintosh's System 7.5 operating system, and X-Windows for the Unix operating system.

In the management of the windows displayed on the computer display screen, the user often will want to manipulate a window. For example, the user may want to reposition a particular window and to resize the window. In the case of the Microsoft Windows oprarating system, there are provided a number of standard mechanisms for manipulating displayed windows. For example, with reference to FIG. 1 of the drawings, the user can click and drag on the title bar 11 of a window 10 to move that window. In addition, the user can click on one of three icons 12, 13 and 14 that appear on the right hand side of the title bar of a window to minimize, maximize, or close the window, respectively.

To resize a window, however, the user must move the cursor to a border (edge or corner) of the window, producing a doubled-headed cursor, and click and drag. When the cursor is on a right or left hand edge of the window, the double-headed cursor is horizontal, and movement of the cursor changes the width of the window. Similarly, when the cursor is on the top or bottom edge of the window, the cursor is vertical, and movement of the cursor changes the height of the window. When the cursor is on a corner of the window, the cursor is at 45° to the vertical (or horizontal), and movement of the cursor changes both the width and height of the window simultaneously. While this works and is intuitive, it has two disadvantages:

1. Borders are typically very narrow (a couple of pixels), and the user has to position the cursor carefully before clicking.
2. Positioning a window exactly where a user may want it on the computer display screen becomes rather clumsy as the user moves between the title bar (where the window is moved) and an edge (where the window is resized) of the window. In particular, a user often wants to use the bottom right corner of the window to allow simultaneous resizing of the horizontal and vertical borders.

When the window is smaller in vertical and horizontal dimensions than the content of the window, scroll bars are displayed on the right and bottom edges of the window. In FIG. 1, the top portion of the right scroll bar 15 is shown and it will be understood that a similar scroll bar may appear at the bottom edge of the window 10. These scroll bars allow the user to vertically scroll and horizontally pan the content of the window so the entire content may be viewed. Again, while this also works and is intuitive, it also has disadvantages. In particular, the user may need to move back and forth between the vertical and horizontal scroll bars in order to view the content of the window. This is a slow and cumbersome process.

In short, while windows-based operating systems implementing graphic user interfaces (GUIs) have made great improvements in the ease of use of computers, especially by many who consider themselves not computer literate, there is still need for improvement of the basic interface to enhance user ease of operation.

SUMMARY OF THE INVENTION

It is therefore an object of the present invention to provide a more convenient way to manipulate a displayed window in a windows-based operating system.

It is another object to provide a user with a convenient way to resize an application window on a computer display screen which also facilitates movement of the window.

It is a further object of the invention to provide a user a convenient way to scroll and pan the displayed content of a window.

According to the invention, there is provided one or more new icons in the title bar of the window. Operations are performed by clicking on one of these new icons and performing a "drag-and-drop" operation of the mouse controlled cursor. One such new icon, called a "corner" icon, is used to resize an application window on the computer display screen and facilitate moving the window after resizing. Instead of moving the cursor to an edge or corner of the window to resize the window, the user simply clicks on this new "corner" icon and drags the icon to resize the window. This mechanism allows other enhancements. For example, an optional magnification factor allows the window to be resized in an amount proportional to a multiple factor of the actual cursor movement. Thus, small changes in cursor movement result in large changes in the window size. The reverse is also useful to allow very precise window positioning. Another such new icon is a "scroll" icon. Instead of using the scroll bars at the right and bottom edges of the window, the user simply clicks on the "scroll" icon and drags it. A vertical movement of the mouse produces a vertical scrolling movement of the content of the window, and a horizontal movement of the mouse produces a horizontal panning movement of the content of the window. The particular advantage of the "scroll" icon is that it is not limited to simply vertical and horizontal movements but may instead be moved in any direction, producing combined scrolling and panning movements of the content of the window.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The invention will be described in terms of a mouse as the displayed cursor control or pointing device. However, those skilled in the art will recognize that other pointing devices, such as IBM's TrackPoint™ device, a track ball, a track pad or other such device can be used interchangeably with a mouse in the practice of the invention. Thus, the term "mouse" as used herein is intended to mean a mouse and all such equivalent devices for controlling a displayed cursor.

Figure 1:
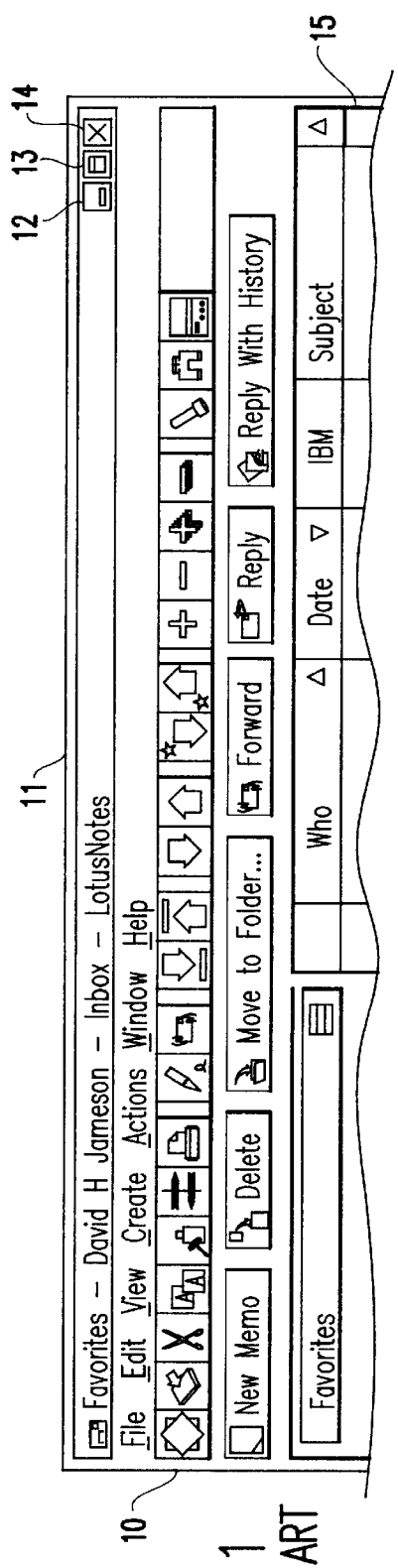
FIG. 1 is a pictorial representation of an upper portion of a conventional window display on a computer display screen.
Figure 2:
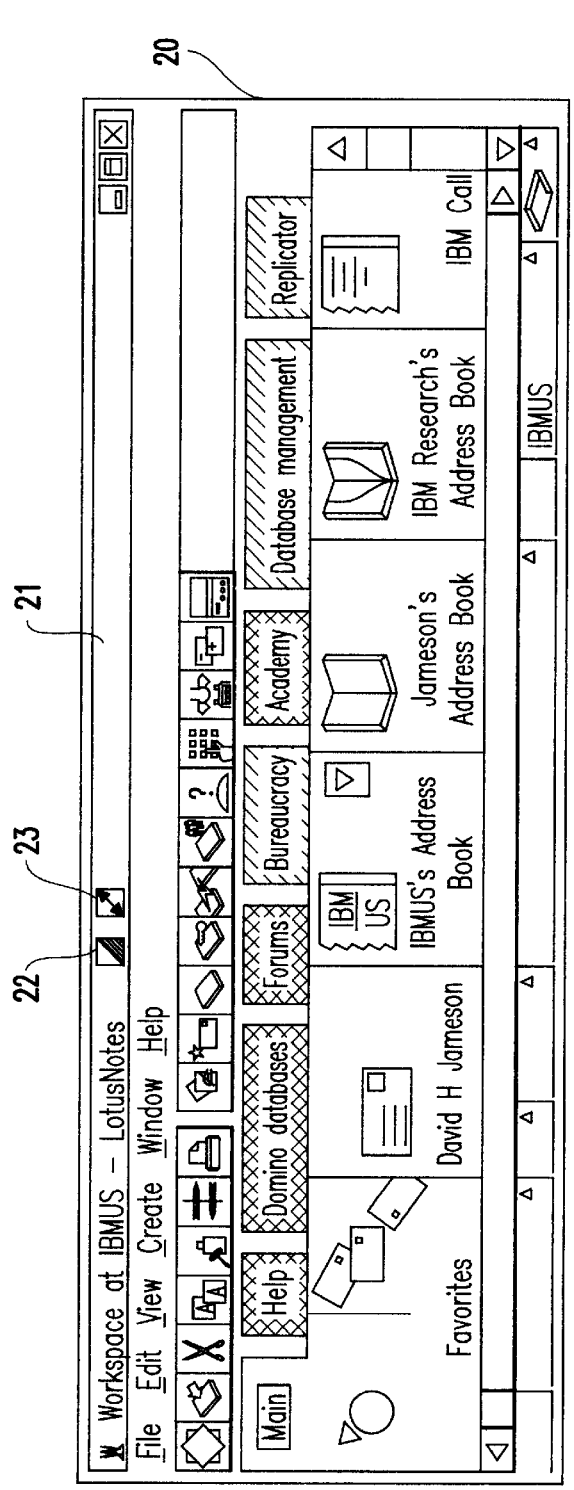
FIG. 2 is a pictorial representation of an upper portion of a window display incorporating new icons according to the invention.

Referring again to the drawings, and more particularly to FIG. 2 there is shown a window 20 having a title bar 21, similar to the conventional window display of FIG. 1. However, a new "corner" icon 22 and a new "scroll" icon 23 are provided in the center of the title bar 21. When the "corner" icon 22 is clicked and dragged, the underlying computer program tracks the changing position of the mouse cursor and sends resize messages to the foreground movement. The resize message (a standard Windows Application Program Interface (API) function call) contains new coordinates for the bottom right corner of the window. The new coordinates are calculated by adding ΔX and ΔY values to the original coordinates of the bottom right of the window. ΔX and ΔY are simply the changes in the X and Y position, respectively, of the cursor. Optionally, these values can be multiplied by a factor, either greater than one or less than one, to allow either rapid or precise resizing, respectively, of the window. For example, by holding the SHIFT key during the click and drag operation, the multiplying or scaling factor is a predetermined value greater than one, producing rapid, coarse resizing of the window, but by holding the ALT key during the click and drag operation, the scaling factor is a predetermined value less than one, producing more precise positioning. Alternatively, the scaling factors can be adjusted to determine how fast or slow the window resizes based on the speed of the moving mouse. That is, if the user makes a rapid movement of the mouse, the resizing of the window will be rapid and coarse, but if the user makes a slow movement of the mouse, the resizing will be slow for more precise resizing. This has the advantage of not requiring an extra key press by the user.

After the resize operation has been completed, the cursor is repositioned so that it is beside the "corner" icon 22 but still inside the title bar. This facilitates multiple resize operations and movement of the window without the need to make coarse mouse cursor movements between the lower right corner of the window and the title bar of the window.

Figure 3:
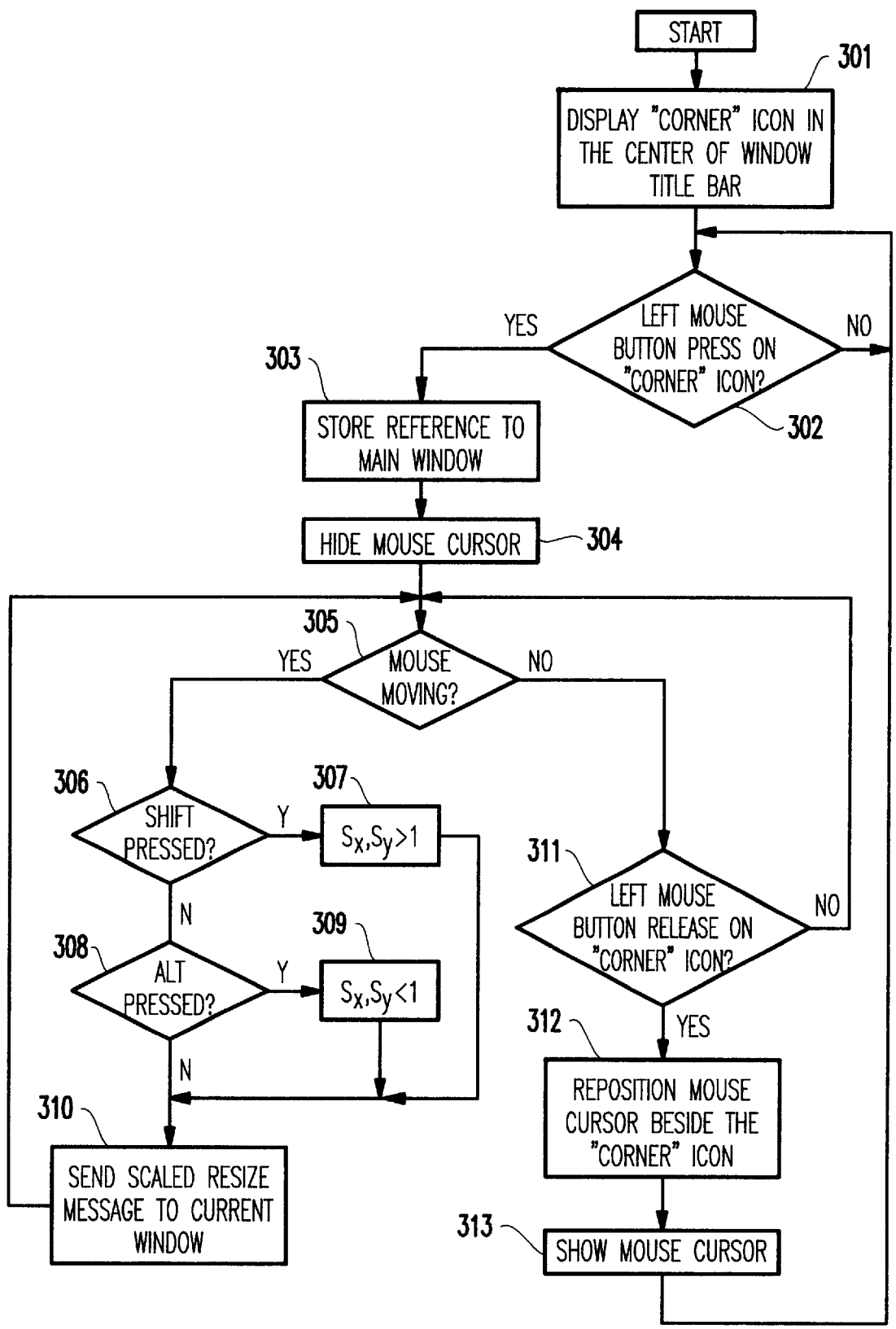
FIG. 3 is a flow diagram showing the logic of the computer process which supports the function of the new "corner" icon.

The flow chart of FIG. 3 illustrates the logic of the computer code which supports the function of the new resizing "corner" icon. The process starts by displaying the icon in the center of the window title bar in function block 301. The decision block 302 detects when the left mouse button is pressed while the cursor is on the icon. When this occurs, the corner coordinates of the window are stored in function block 303, and then the mouse cursor is hidden in function block 304. Movement of the mouse is detected in decision block 305. A determination is made in decision block 306 as to whether the SHIFT key is pressed. If so, the scaling factor is made greater than one in function block 307; otherwise, a decision is made in function block 308 as to whether the ALT key is pressed. If so, the scaling factor is made less than one in function block 309; otherwise, the process goes directly to function block 310 which also receives the outputs of function blocks 307 and 309.

Alternatively, the scaling factors may be made a function of the speed of movement of the mouse. In this case, a determination is made in decision block 306 as to whether the mouse is being moved fast, and if so, the scaling factor is made greater than one in function block 307, and a determination is made in decision block 308 as to whether the mouse is being moved slowly, and if so, the scaling factor is made to be greater than one in function block 309. In this alternative embodiment, the scaling factor may be made proportional to mouse speed, rather than being a fixed predetermined value, thus allowing more flexibility in the operation.

As the mouse is moved, scaled resize messages are sent to the current window in function block 310. These resize messages are calculated using the following factors:

X=Absolute x position of mouse

Y=Absolute y position of mouse $X_{down}$=x position of mouse when mouse button is pressed $Y_{down}$=y position of mouse when mouse button is pressed $\Delta X = X_{down} - X$ $\Delta Y = Y_{down} - Y$ $S_x$=Scaling factor in x direction $S_y$=Scaling factor in y direction W=Current width of window H=Current height of window W'=New width of window H'=New height of window We want to calculate the new width W' and height H' of the window based on the movement of the mouse. These are the absolute values that are sent to resize the window. The equations are as follows:

$$W' = W + (X - X_{down}) \times S_x$$

$$H' = H + (Y - Y_{down}) \times S_y$$

As mentioned, the scaling factors $S_x, S_y$ can be predetermined values selected by pressing, for example, the SHIFT or ALT keys. Alternatively, the scaling factors can be adjusted to determine how fast or slow the window resizes based the speed of the moving mouse.

When the mouse is not moving, a test is made in decision block 311 to determine if the left mouse button has been released. If not, the process loops back to decision block 305 to detect mouse movement. However, if the left mouse button has been released, the mouse cursor is repositioned beside the new "corner" icon in function block 312, and the mouse cursor is redisplayed in function block 313 before a return is made to decision block 302. By redisplaying the mouse cursor beside the new "corner" icon but still inside the window title bar, it is immediately available to the user for moving window.

Referring back to FIG. 2, consider next the "scroll" icon 23. When the user clicks on this icon and drags it, the content of the window 20 is scrolled or panned or both scrolled and panned as a function of the mouse movement.

Figure 4:
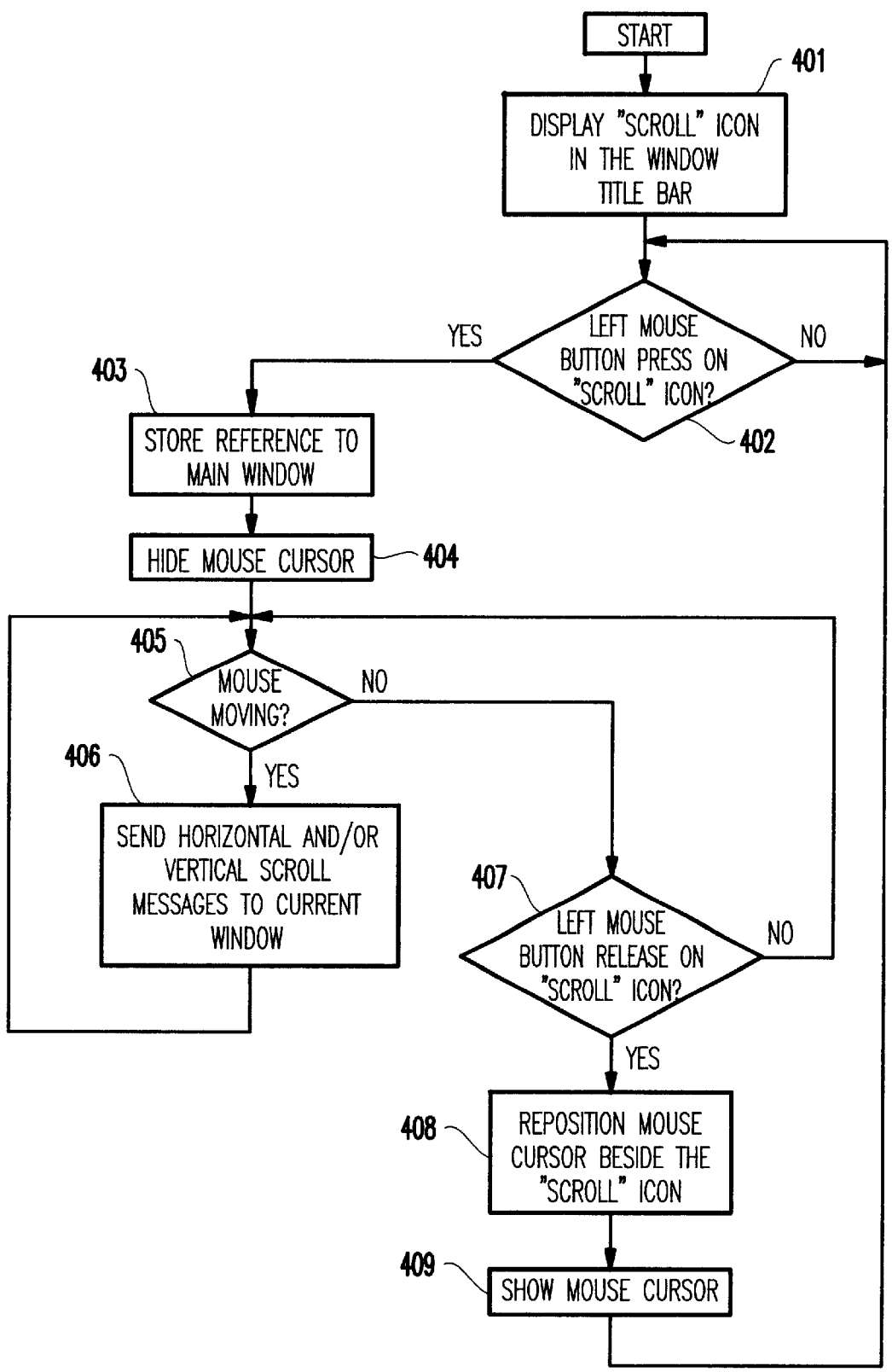
FIG. 4 is a flow diagram showing the logic of the computer process which supports the function of the new "scroll" icon.

The flow chart of FIG. 4 illustrates the logic of the computer code which supports the function of the new resizing "scroll" icon. The process starts by displaying the icon in the center of the window title bar in function block

401. The decision block 402 detects when the left mouse button is pressed while the cursor is on the icon. When this occurs, the corner coordinates of the window are stored in function block 403, and then the mouse cursor is hidden in function block 404. Movement of the mouse is detected in decision block 405. As the mouse is moved, horizontal and/or vertical scroll messages are sent to the current window in function block 406. As with resizing, a scaling factor can be applied to determine how fast scrolling and/or panning should occur as the mouse is moved. This can be accomplished as described above by pressing a designated key while moving the mouse or detecting the speed with which the mouse is moved.

When the mouse is not moving, a test is made in decision block 407 to determine if the left mouse button has been released. If not, the process loops back to decision block 405 to detect mouse movement. However, if the left mouse button has been released, the mouse cursor is repositioned beside the new "scroll" icon in function block 408, and the mouse cursor is redisplayed in function block 409 before a return is made to decision block 402. By redisplaying the mouse cursor beside the new "scroll" icon but still inside the window title bar, it is immediately available to the user for moving window or selecting another icon in the title bar, such as the "corner" icon.

In the preferred implementation, the "corner" icon 22 and the "scroll" icon 23 are simply integrated into the operating system just like the other icons on the title bar; however, the invention can be practiced using code which is not part of the operating system.

Sizing and scrolling are but two examples of operations that can be applied to windows or their content as a mouse is moved after first clicking on an icon in the title bar of the window. The principles of the invention can just as easily be applied to other operations whose results are controllable by parameter values. Examples include the following:

1. Change the amount of foreground and background color of a picture or text.
2. Change the contrast and brightness of a picture.
3. Zoom in or out in a view.
4. Adjust the overall size of elements in a document.

It is important to differentiate between the new icons of the present invention and those icons which conventionally appear on toolbars. The fundamental difference between these new icons and those conventionally appearing on toolbars is that the latter are used to apply a single operation to the system, whereas the new icons of this invention are used to apply continuous changes. Also, while the new icons of this invention have been shown in their preferred embodiment as being displayed in the title bar of the window, they could be displayed in a separate tool bar just for such icons.

While the invention has been described in terms of exemplary preferred embodiments with alternative implementations, those skilled in the art will recognize that the invention can be practiced with modification within the spirit and scope of the appended claims.

Having thus described my invention, what I claim as new and desire to secure by Letters Patent is as follows:

1. A user interface enhancemrnt to a windowing display system for a computer operating sysstem in which a cursor is controlled by a mouse, the enhancement being a method comprising the steps of:

displaying one or more icons in a bar of a window on a computer display screen, said bar being just for such icons;

enabling a coninuous change in said window by user selection of one of said icons, said selection being accomplished by pressing a control of said mouse while said cursor is on said icon;

responding to a user holding said selection and moving the mouse controlled cursor to preform said continuous change to the display window, wherein parameter values controlling said continuous change are determined by movement of said mouse controlled cursor, measures of said mouse controlled cursor movement producing corresponding changes in said parameter values, said holding being accomplished by continuing to press said control on said mouse, said icon remaining in place on the bar, said mouse controlled cursor not being fixed during said movement to a location on said window;

upon a release by the user of said holding control, redisplayed a cursor in the bar adjacent the icon to facilitate further selections from the bar by the user, further including the step of optionally scaling detected changes of the position of the mouse controlled cursor by a value other than one, wherein the step of responding to a user moving the mouse controlled cursor includes the step of calculating said continuous change based on detected changes in a position of the mouse controlled cursor, and wherein the selected icon is a "corner" icon used for resizing the window.

2. The user interface enhancement recited in claim 1 wherein the "corner" icon is displayed in a title bar of the window and, upon release by the user of said holding control, the cursor is redisplayed in the title bar adjacent the "corner" icon to facilitate a movement of the window after resizing the window.

3. The user interface enhancement recited in claim 2 wherein the step of responding is performed by the steps of:

storing coordinate information of the window; and sending resize messages containing new coordinates of the lower right corner of the window calculated based on changes in a position of the mouse controlled cursor.

4. A user interface enhancemrnt to a windowing display system for a computer operating sysstem in which a cursor is controlled by a mouse, the enhancement being a method comprising the steps of:

displaying one or more icons in a bar of a window on a computer display screen, said bar being just for such icons;

enabling a coninuous change in said window by user selection of one of said icons, said selection being accomplished by pressing a control of said mouse while said cursor is on said icon;

responding to a user holding said selection and moving the mouse controlled cursor to preform said continuous change to the display window, wherein parameter values controlling said continuous change are determined by movement of said mouse controlled cursor, measures of said mouse controlled cursor movement producing corresponding changes in said parameter values, said holding being accomplished by continuing to press said control on said mouse, said icon remaining in place on the bar, said mouse controlled cursor not being fixed during said movement to a location on said window;

upon a release by the user of said holding control, redisplayed a cursor in the bar adjacent the icon to facilitate further selections from the bar by the user, further including the step of optionally scaling detected changes of the position of the mouse controlled cursor by a value other than one, wherein the step of responding to a user moving the mouse controlled cursor includes the step of calculating said continuous change based on detected changes in a position of the mouse controlled cursor, and wherein the selected icon is a "scroll" used for scrolling and panning a content of the window.

5. The user interface enhancement recited in claim 4 wherein the step of responding is performed by the steps of:

storing coordinate information of the window; and sending scroll messages containing new coordinates of the content of the window calculated based on changes in a position of the mouse controlled cursor.

6. A user interface enhancemrnt to a windowing display system for a computer operating sysstem in which a cursor is controlled by a mouse, the enhancement being a method comprising the steps of:

displaying one or more icons in a bar of a window on a computer display screen, said bar being just for such icons;

enabling a coninuous change in said window by user selection of one of said icons, said selection being accomplished by pressing a control of said mouse while said cursor is on said icon;

responding to a user holding said selection and moving the mouse controlled cursor to preform said continuous change to the display window, wherein parameter values controlling said continuous change are determined by movement of said mouse controlled cursor, measures of said mouse controlled cursor movement producing corresponding changes in said parameter values, said holding being accomplished by continuing to press said control on said mouse, said icon remaining in place on the bar, said mouse controlled cursor not being fixed during said movement to a location on said window;

upon a release by the user of said holding control, redisplayed a cursor in the bar adjacent the icon to facilitate further selections from the bar by the user, further including the step of optionally scaling detected changes of the position of the mouse controlled cursor by a value other than one, wherein the step of responding to a user moving the mouse controlled cursor includes the step of calculating said continuous change based on detected changes in a position of the mouse controlled cursor, wherein the value is greater than one allowing said continuous change to be more rapid, and wherein the selected icon is used for positioning the window on the computer display screen.

7. A user interface enhancemrnt to a windowing display system for a computer operating sysstem in which a cursor is controlled by a mouse, the enhancement being a method comprising the steps of:

displaying one or more icons in a bar of a window on a computer display screen, said bar being just for such icons;

enabling a coninuous change in said window by user selection of one of said icons, said selection being accomplished by pressing a control of said mouse while said cursor is on said icon;

responding to a user holding said selection and moving the mouse controlled cursor to preform said continuous change to the display window, wherein parameter values controlling said continuous change are determined by movement of said mouse controlled cursor, measures of said mouse controlled cursor movement producing corresponding changes in said parameter values, said holding being accomplished by continuing to press said control on said mouse, said icon remaining in place on the bar, said mouse controlled cursor not being fixed during said movement to a location on said window;

upon a release by the user of said holding control, redisplayed a cursor in the bar adjacent the icon to facilitate further selections from the bar by the user, further including the step of optionally scaling detected changes of the position of the mouse controlled cursor by a value other than one, wherein the step of responding to a user moving the mouse controlled cursor includes the step of calculating said continuous change based on detected changes in a position of the mouse controlled cursor, wherein the value is greater than one allowing said continuous change to be more rapid, and wherein the selected icon is a "scroll" icon for scrolling and panning a content of the window, said value greater than one allowing for rapid scrolling and panning of the content of the window.

8. A user interface enhancemrnt to a windowing display system for a computer operating sysstem in which a cursor is controlled by a mouse, the enhancement being a method comprising the steps of:

displaying one or more icons in a bar of a window on a computer display screen, said bar being just for such icons;

enabling a coninuous change in said window by user selection of one of said icons, said selection being accomplished by pressing a control of said mouse while said cursor is on said icon;

responding to a user holding said selection and moving the mouse controlled cursor to preform said continuous change to the display window, wherein parameter values controlling said continuous change are determined by movement of said mouse controlled cursor, measures of said mouse controlled cursor movement producing corresponding changes in said parameter values, said holding being accomplished by continuing to press said control on said mouse, said icon remaining in place on the bar, said mouse controlled cursor not being fixed during said movement to a location on said window;

upon a release by the user of said holding control, redisplayed a cursor in the bar adjacent the icon to facilitate further selections from the bar by the user, further including the step of optionally scaling detected changes of the position of the mouse controlled cursor by a value other than one, wherein the step of responding to a user moving the mouse controlled cursor includes the step of calculating said continuous change based on detected changes in a position of the mouse controlled cursor, wherein the value is greater than one allowing said continuous change to be more precise, and wherein the selected icon is a "scroll" icon for scrolling and panning a content of the window, said values less than one allowing for slow scrolling and panning of the content of the window.

9. A user interface enhancemrnt to a windowing display system for a computer operating sysstem in which a cursor is controlled by a mouse, the enhancement being a method comprising the steps of:

displaying one or more icons in a bar of a window on a computer display screen, said bar being just for such icons;

enabling a coninuous change in said window by user selection of one of said icons, said selection being accomplished by pressing a control of said mouse while said cursor is on said icon;

responding to a user holding said selection and moving the mouse controlled cursor to preform said continuous change to the display window, wherein parameter values controlling said continuous change are determined by movement of said mouse controlled cursor, measures of said mouse controlled cursor movement producing corresponding changes in said parameter values, said holding being accomplished by continuing to press said control on said mouse, said icon remaining in place on the bar, said mouse controlled cursor not being fixed during said movement to a location on said window;

upon a release by the user of said holding control, redisplayed a cursor in the bar adjacent the icon to facilitate further selections from the bar by the user, further including the step of optionally scaling detected changes of the position of the mouse controlled cursor by a value other than one, wherein the step of responding to a user moving the mouse controlled cursor includes the step of calculating said continuous change based on detected changes in a position of the mouse controlled cursor, wherein the value is greater than one allowing said continuous change to be more rapid, and wherein the selected icon is a "corner" icon for resizing the window, said value greater than one allowing for rapid resizing of the window.

10. A user interface enhancemrnt to a windowing display system for a computer operating sysstem in which a cursor is controlled by a mouse, the enhancement being a method comprising the steps of:

displaying one or more icons in a bar of a window on a computer display screen, said bar being just for such icons;

enabling a coninuous change in said window by user selection of one of said icons, said selection being accomplished by pressing a control of said mouse while said cursor is on said icon;

responding to a user holding said selection and moving the mouse controlled cursor to preform said continuous change to the display window, wherein parameter values controlling said continuous change are determined by movement of said mouse controlled cursor, measures of said mouse controlled cursor movement producing corresponding changes in said parameter values, said holding being accomplished by continuing to press said control on said mouse, said icon remaining in place on the bar, said mouse controlled cursor not being fixed during said movement to a location on said window;

upon a release by the user of said holding control, redisplayed a cursor in the bar adjacent the icon to facilitate further selections from the bar by the user, further including the step of optionally scaling detected changes of the position of the mouse controlled cursor by a value other than one, wherein the step of responding to a user moving the mouse controlled cursor includes the step of calculating said continuous change based on detected changes in a position of the mouse controlled cursor, wherein the value is greater than one allowing said continuous change to be more precise, and wherein the selected icon is a "corner" icon for resizing the window, said value less than one allowing for slow resizing of the window.

11. A user interface enhancemrnt to a windowing display system for a computer operating sysstem in which a cursor is controlled by a mouse, the enhancement being a method comprising the steps of:

displaying one or more icons in a bar of a window on a computer display screen, said bar being just for such icons;

enabling a coninuous change in said window by user selection of one of said icons, said selection being accomplished by pressing a control of said mouse while said cursor is on said icon;

responding to a user holding said selection and moving the mouse controlled cursor to preform said continuous change to the display window, wherein parameter values controlling said continuous change are determined by movement of said mouse controlled cursor, measures of said mouse controlled cursor movement producing corresponding changes in said parameter values, said holding being accomplished by continuing to press said control on said mouse, said icon remaining in place on the bar, said mouse controlled cursor not being fixed during said movement to a location on said window;

upon a release by the user of said holding control, redisplayed a cursor in the bar adjacent the icon to facilitate further selections from the bar by the user, further including the step of optionally scaling detected changes of the position of the mouse controlled cursor by a value other than one, wherein the step of responding to a user moving the mouse controlled cursor includes the step of calculating said continuous change based on detected changes in a position of the mouse controlled cursor, and wherein said one or more icons include a "corner" icon used for resizing the window and a "scroll" icon for scrolling and panning a content of the window.

12. The user interface enhancement recited in claim 11 wherein the "corner" and "scroll" icons are displayed in a title bar of the window.

* * * * *